United States Patent [19]

Seiberling

[11] 4,176,702

[45] * Dec. 4, 1979

[54] TIRE TREADS AND THEIR MANUFACTURE

[75] Inventor: Theophilus K. Seiberling, Akron, Ohio

[73] Assignee: Mildred Kelly Seiberling, Akron, Ohio ; a part interest

[*] Notice: The portion of the term of this patent subsequent to Jan. 20, 1993, has been disclaimed.

[21] Appl. No.: 774,809

[22] Filed: Mar. 7, 1977

Related U.S. Application Data

[63] Continuation of Ser. No. 702,623, Jul. 6, 1976, Pat. No. 4,139,405, which is a continuation-in-part of Ser. No. 627,136, Oct. 30, 1975, which is a continuation of Ser. No. 395,346, Sep. 7, 1973, Pat. No. 3,933,553, which is a continuation of Ser. No. 321,421, Jan. 5, 1973, abandoned, which is a continuation-in-part of Ser. No. 838,512, Jul. 2, 1969, abandoned.

[51] Int. Cl.² .................................... B60C 11/00
[52] U.S. Cl. ........................ 152/209 R; 152/357 R; 156/96; 156/128 R; 156/272; 250/492 B; 428/36
[58] Field of Search ........... 156/95, 96, 110 R, 123 R, 156/128 R, 128 T, 129, 130, 272, 380, 394 R, 394 FM; 264/22, 326, 36, 315, 340, 347; 204/159.2, 160.1; 152/209 R, 330 R, 357 R; 250/492 B, 492 R; 428/35, 36

[56] References Cited

U.S. PATENT DOCUMENTS

| | | | |
|---|---|---|---|
| 844,820 | 2/1907 | Marks | 156/128 R |
| 1,426,672 | 8/1922 | Radford | 156/96 |
| 1,488,343 | 3/1924 | Hoffman | 156/128 R |
| 1,906,402 | 5/1933 | Newton | 264/22 |
| 2,494,958 | 1/1950 | Musselman | 156/128 R |
| 2,907,365 | 10/1959 | MacDonald | 156/129 |
| 2,933,441 | 4/1960 | Mallon | 264/22 |
| 3,330,748 | 7/1967 | Lawton | 204/159.11 |
| 3,472,714 | 10/1969 | Ragan | 156/96 |
| 3,644,186 | 2/1972 | Gracia et al. | 204/159.2 |
| 3,719,541 | 3/1973 | Takahashi et al. | 156/272 |
| 3,853,681 | 12/1974 | Kehr et al. | 156/272 |
| 3,901,751 | 8/1975 | Wilson | 156/133 |
| 3,959,053 | 5/1976 | Fisk et al. | 264/326 X |
| 4,020,354 | 4/1977 | Fauss et al. | 250/492 B |

FOREIGN PATENT DOCUMENTS 1448532  9/1976  United Kingdom ............... 156/123

Primary Examiner—John E. Kittle
Attorney, Agent, or Firm—Harold S. Meyer

[57] ABSTRACT

Tread stock is partially cured by irradiation before assembly in the tire, so as to shorten the curing time of the tire in the mold and thereby create substantial savings.

Tires are retreaded by applying ribbons of tread stock over the carcass prepared in any conventional manner, and then completing the cure without the use of a mold.

Curing or partial curing may be effected by electron irradiation or other irradiation which changes the molecular structure of the rubber. Progressive irradiation is disclosed by which an object is repeatedly irradiated to attain a desired cure. Shielding of one or more portions of a green tire or tire element is disclosed to prevent the irradiation from curing the shielded rubber. Other methods of curing may be preferable in some operations.

Curing (1) a portion of the area of tread stock and (2) curing a portion of the thickness of tread stock are disclosed herein.

50 Claims, 27 Drawing Figures

TIRE TREADS AND THEIR MANUFACTURE

CROSS-REFERENCE

This application is a continuation of Ser. No. 702,623 filed July 6, 1976 now U.S. Pat. No. 4,139,405 which is a continuation-in-part of Ser. No. 627,136 filed Oct. 30, 1975 which is a continuation of Ser. No. 395,346 filed Sept. 7, 1973 (now U.S. Pat. No. 3,933,553) which is a continuation of Ser. No. 321,421 filed Jan. 5, 1973 (now abandoned) which was a continuation-in-part of Ser. No. 838,512 filed July 2, 1969 (now abandoned). U.S. Pat. No. 3,933,566 has matured from Ser. No. 454,207 which was a continuation of Ser. No. 321,421, supra.

PRIOR ART

Marks Ser. No. 844,820 discloses semi-vulcanizing the body of a tire, roughening the surface and coating it with cement. A partially vulcanized tread is put in place and vulcanization is completed. No radiation is disclosed.

Hopkinson U.S. Pat. No. 1,289,771 and Hoffman No. 1,488,343 disclose procedures for first partially curing a tire part, and then completing the vulcanization. No radiation is disclosed.

In Mallon U.S. Pat. No. 2,933,441 a tire is set in a mold until the body portion is set. The tire is removed from the mold and the tread is radiated until completely cured.

Newton U.S. Pat. No. 1,986,402 refers to curing rubber by electron irration but makes no mention of treads.

Progressive radiation of polyethylene is disclosed in Lawton U.S. Pat. No. 3,330,748.

SUMMARY OF THE INVENTION

The invention relates to radiation which changes the molecular structure of rubber and more particularly to the use of electron radiation in the production of new tires and the retreading of old tires, although other means of radiation may be employed, and for most operations other means of curing may be used, as explained.

Electron radiation has been known for some years and in recent years equipment utilizing up to a million volts or more has become available for commercial use. The voltage employed determines the depth of penetration of the electron rays. For example, radiation generated by a million volts will penetrate an item having a density of 1 to a depth of ⅜ inch. By varying the voltage, the depth of the penetration may be varied. Thus, a portion of the thickness of tires may be cured by curing to a depth of ⅜ inch or more, depending upon the rubber employed, the compounding formula, and the voltage used. By using higher voltages and radiating both surfaces of a tire, tires of much greater thickness may be cured. When only one surface is irradiated, beyond the depth at which the rubber is cured there is a partial curing which becomes less as the distance from the rubber surface increases.

The amperage will be varied depending upon the area subjected to radiation. The new equipment provides for irradiating an area of several square inches, up to for example 12 square inches or more.

By shielding one or more portions of a tire or tire element as with aluminum or other suitable material, such as steel or lead or a plastic, the area or areas to be irradiated are controlled. The material treated and the irradiation equipment may both be stationary, or at least one may be moved with respect to the other during the irradiation. The shape of the shield may be varied to provide greater radiation of one portion of rubber than another portion, such as an adjoining portion. An application of this would be when a material is moving under a shield with an irregular edge during treatment by irradiation. Also, the depth to which radiation will penetrate different areas of a shield may be varied by making different portions of the shield of different shielding materials.

By irradiating natural rubber or synthetics such as butadiene-styrene, polybutadiene, polyisoprene, etc., the molecular structure is rearranged. Other rubbers, perhaps known by other names, will become commercial and may be used as disclosed herein. The rearranged rubber is partially or completely cured. By that it is meant that rubber which is thermoplastic when irradiated becomes partially or entirely thermoset (vulcanized) with or without sulfur.

Irradiation has no beneficial effect on so-called "butyl" (copolymer of isobutene and either isoprene or butadiene) rubber and certain other rubbers including butyl derivatives.

Radiation may be used to treat a green tire or part of a green tire, or the tread in retreading, or a tread produced from ribbons of tread stock in retreading or the extruded tread stock in the manufacture of new tires or in retreading.

The rubber may be cured instantaneously by subjection to irradiation, and this may be done in a continuous operation in which the source of radiation and the rubber are moved continuously relatively to one another. Alternatively, the rubber may be cured by progressive irradiation. Progressive irradiation is accomplished by partially curing a piece of rubber in one exposure to the source of radiation, and then giving it one or more additional exposures each of which partially cures the rubber, until the rubber is cured. For example, by exposing the same rubber a number of times as by rotating a tire continuously and applying a thin layer of the rubber to the tire as it is rotated, and continuing the application of the thin layer throughout several rotations of the tire and as each thin layer is applied to the tire, exposing the rubber to irradiation to partially cure it so that as the tire is rotated a number of times in building up a desired thickness of the carcass or tread and by continuing the rotation a number of times after completing the application of the rubber, the rubber is progressively and completely cured.

The production of new tires will be discussed, and the retreading of tires; also equipment used in such manufacturing procedures.

NEW TIRES

The inner surface of a green tire with a liner, whether the liner be cured before incorporation in the tire or whether the inner surface of the liner be cured after the green tire is formed, is resistant to the passage of steam or hot water. Therefore, this green tire can be cured in a mold without an air-bag or bladder. The mold may be of usual construction except that there is no provision for an air-bag, and modification for support and/or formation of the beads may be desirable.

Figure 1:
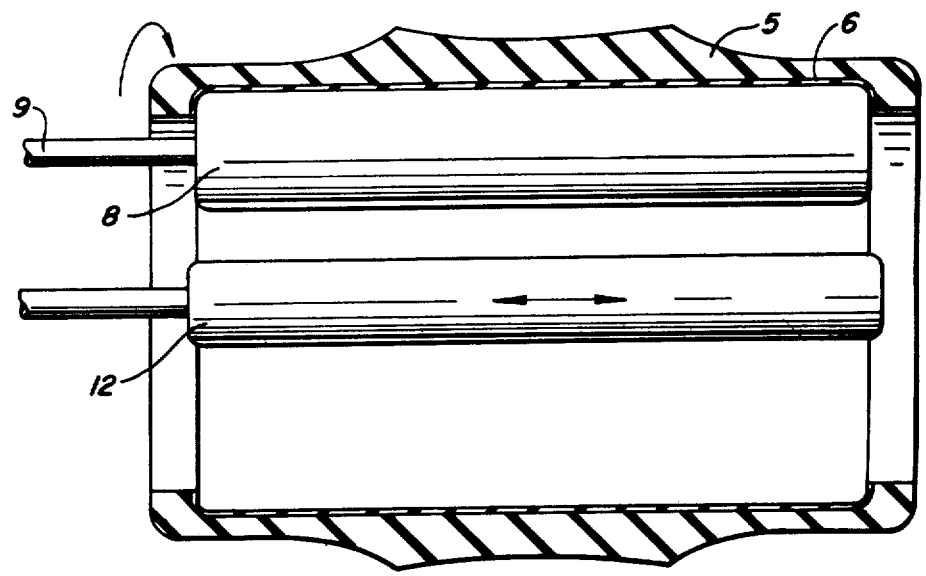
FIG. 1 is a section through a green tire with a liner with the inner surface being irradiated.

FIG. 1 is an illustration of equipment that may be used for curing the liner of a green tire in which an uncured liner has been incorporated on the tire-building drum. The green tire 5, provided with the liner 6, is placed over a roller 8 the shaft 9 of which will ordinarily be mechanically driven, although it may be operated by hand. The green tire is readily placed over the roller as indicated in FIG. 1. Although the inner surface of the tire, and primarily the liner, may be cured by any means, it is preferably cured by electron irradiation. A suitable device 12 for effecting irradiation is moved into the position shown in FIG. 1 to effect the irradiation with the irradiation device directed toward the liner. Normally, a longitudinal section of 12, extending through approximately the entire width of the tire, will give off rays, and the entire inner surface of the tire will be irradiated by moving that surface under the longitudinal section by rotating the roller 8. Normally the irradiation will not be sufficient to cure any more than the inner surface of the liner to a depth of perhaps 1/16 inch.

Figure 2:
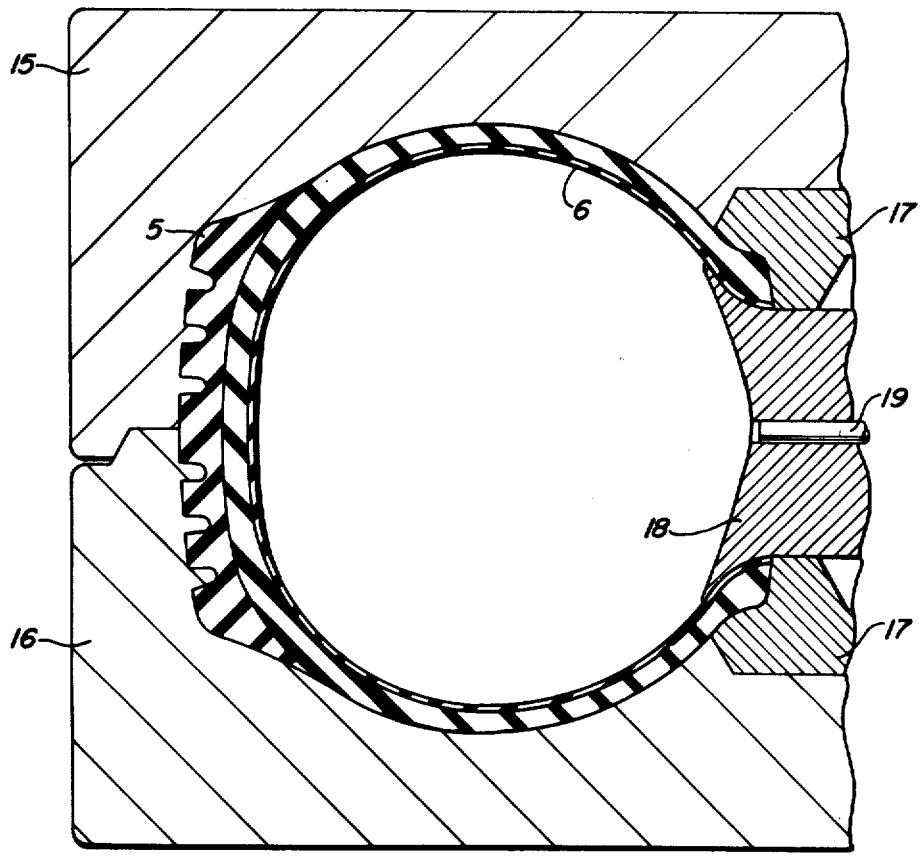
FIG. 2 is a section through a mold containing a tire being cured without an air-bag or bladder.

FIG. 2 illustrates a mold for curing any of these tires, and it will be noted that no air-bag or bladder is utilized. The mold is constructed in any usual manner. It is shown as being formed of an upper part 15 and lower part 16 with two bead rings 17 fitted into the upper and lower parts to contact the beads of the tire 5. The bead-sealing ring 18 may be inserted in the same operation that the conventional bladder or air-bag is inserted.

The steam or hot water is led into the mold through the pipe 19 and provides sufficient pressure within the tire to force it against the mold to groove the tread and form any desired identification and indicia marks desired on the tire surface.

Figure 3:
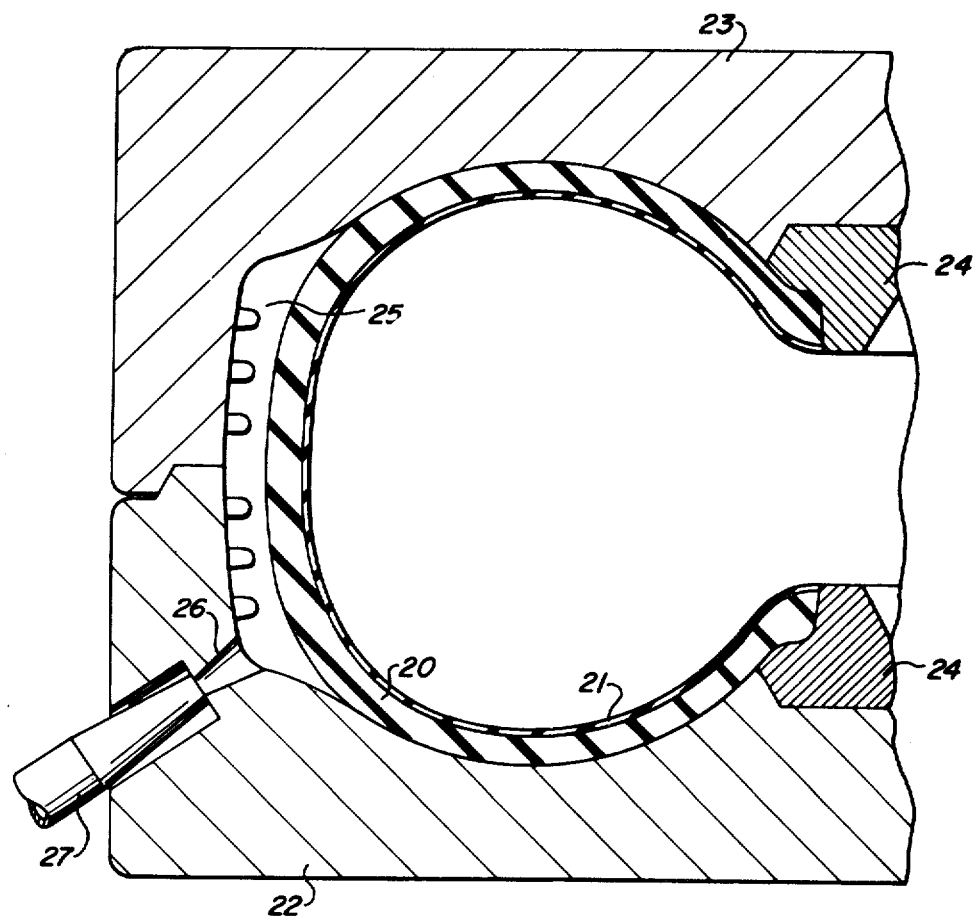
FIG. 3 is a section through a conventional mold provided with means for extrusion of tread rubber into the mold.

A new method of applying a tread to a green carcass is illustrated in FIG. 3. The carcass 20 is built up in a conventional manner, with or without liner 21, on a tire-building machine and the carcass 20 is placed in the mold shown in FIG. 3, which may be heated in the conventional manner, which comprises a lower part 22 and an upper part 23 with two bead rings 24 fitted into the upper and lower parts to contact the beads of the tire 20. The mold is conventional except for the orifice 26 through which tread rubber is injected, being fed from nozzle 27. A conventional air-bag or bladder may be used or the process using neither of these and previously described may be used. Hot water or steam under pressure is used to expand the green carcass against the sides of the mold. This pressure, before the tread is injected into the mold, may be less than conventional curing pressures and only sufficient to press the green carcass into position against the sides of the mold. The tread stock is injected at temperatures at which it flows readily under pressure, such as temperatures of approximately 280° F. and higher, through orifice 26 from nozzle 27.

The tread stock is usually introduced at or near the low point of the empty portion of the mold cavity outside of the carcass. It may be introduced at several points. As it is introduced, the air is vented through the air vents usually found in the tire mold, or separate vent means may be provided. When the tread has been injected the pressure in the tire is raised to conventional levels and the carcass is completely cured. It is impractical to thus inject tread stock which contains the usual quantity of sulfur and accelerator or the like for curing because the temperature required for rendering the rubber sufficiently fluid for injection is high enough to cure such stock. An exception is, when coldfeed extruders are used, in which case cold stock is fed into the machine and is raised to high temperatures only for a small increment of time before being extruded. According to this invention, the curing agent added to the tread rubber is only sufficient to partially cure the tread so that it may be removed from the mold after curing the carcass, without causing damage to the tread, such as blowing. The tire is then removed from the mold and the tread is cured by rearrangement of the molecules of the rubber in the tread stock, by irradiation or other means. An advantage of this method is the elimination of inventories of uncured treads with inherent savings such as floor space, investment, labor, etc.

Alternatively, if irradiation which penetrates to a sufficient depth is used, the tread may be cured in the mold before the tire is removed.

When tires are cured by irradiation, even though no sulfur be employed, reinforcing agents, antioxidants, antiozonants, etc. may advantageously be added.

Rubber, the molecular structure of which has been rearranged by electron irradiation may take various forms as a sealant. It need not be rubber irradiated on only one surface. Both surfaces of a sheet may be irradiated without irradiation of the central portion of the sheet or the rubber sheet may be irradiated throughout. A sheet of rubber irradiated on both surfaces, with or without the central portion irradiated, may serve as a sealant for a 3-ply laminate. Thus, three sheets of rubber, in contact with one another, may be subjected to irradiation to cause them to adhere to one another. Or the surfaces of the central sheet may be irradiated, and while they are still tacky be pressed between the other two sheets. Or one or several small pieces of rubber, perhaps each the size of a quarter of a dollar and, for example, ⅛ inch thick, may be positioned separate from one rubber, and perhaps widely separated from each other, between two sheets of rubber or between two pieces of any material the molecular structure of which is not altered by irradiation, and the whole subjected to irradiation, for example progressive irradiation, to cause them to adhere to one another.

As disclosed herein, by irradiation which rearranges the rubber, adhesion between the partially cured and cured plies is improved. Adhesive may be employed to insure adhesion.

In cases where the carcass is thin or where tires have a steel ply or plies which may or may not form a belt, it may not be desirable to pre-cure or partially pre-cure any portion thereof. Steel conducts heat more rapidly than most fibers and plies of steel therefore require a different curing time, and no pre-curing may be necessary. Then there may be cases where it is desirable to cure or partially cure one or more of the carcass plies, or portions of the carcass ply or plies and the tread stock, or portion thereof.

PRE-CURING THE TREAD STOCK

It has long been the desire of the tire industry to reduce the curing time of tires in the curing presses; the object being to reduce investment in equipment and floor space and thereby make substantial savings. A way to accomplish this is, before the tire is cured in a press to cure or partially cure elements of the tire, such as the tread stock or a tire ply, which require long curing time in the press. Some elements or sections of elements of a tire, such as portions of the tread stock that form the shoulders of the tread, may require longer curing time than other sections or portions. This is because those elements requiring longer curing time are located deep in the tire and farther removed from the heating surface.

For example, if portions of an element such as the inner portion of the middle section of the tread stock is partially cured to such a degree that it is cured to approximately 40 percent of full cure before going into the tire press, the curing time of the element in the press would be substantially reduced and therefore the curing time of the tire may be reduced accordingly.

When the molecules of a rubber piece are rearranged by radiation, the extent or degree of the cure depends upon the amount of the rearrangement of the molecules. This depends upon the number of rads which act on the rubber. A further consideration is the depth of penetration by the electrons, etc. and this is determined by the voltage used in the treatment. Irradiation which rearranges the molecular structure is of great importance in the methods and processes disclosed herein. Two important reasons are (1st) with said irradiation, the depth of cure of any specific area to be cured and the degree of cure may be controlled satisfactory. However, with heat and sulfur curing this is very difficult and not practical. (2nd) The energy cost of curing by irradiation has been estimated to be less than the energy cost of curing by heat and sulfur. Due to tread design the tread stock is often an element which lends itself to the process of a portion or portions being cured or partially cured before the tire is cured. This is sometimes called pre-curing or partially pre-curing.

The processes for accomplishing these objectives are disclosed in the following disclosure and particularly the use of said irradiation and the shielding of said irradiation.

When rubber is cured or pre-cured by irradiation which changes the molecular structure, some of the physical properties are different from a similar piece of rubber cured with sulfur and heat. For example, rubber cured by said irradiation has a little less tensile strength but more resistance to crack growth than rubber cured by heat and sulfur. In tests it has been observed that rubber partially cured by said irradiation has slightly more tack than similar rubbers partially cured by heat and sulfur. The fact that rubber cured by said irradiation has different physical characteristics makes possible processes which produce satisfactory results that are not accomplished with the present practice which uses heat and sulfur curing. It is generally accepted in the tire industry that satisfactory results cannot be obtained by putting a cured or partially cured tread on a green or cured tire carcass. The results are not satisfactory because it has been found that during service the elements cured or partially cured with sulfur do not have adequate adhesion to the elements they contact and there is separation between said elements causing a defect. However, it has now been found that satisfactory adhesion can be obtained by partially curing a tire ply by electron irradiation and partially curing a tread stock by electron irradiation, both having been compounded with sulfur, and then putting the two together under pressure and completing the cure with heat. Also, it has been found that prior to assembly of the tread stock with the carcass, by partially curing by electron irradiation, a portion of the underside of a tread stock compounded for curing conventionally and then curing the assembled tire with heat and sulfur, the curing time of the tires was reduced 25 percent, the time being reduced from 16 minutes to 12 minutes. The finished tread on the tire did not show any evidence of undercure. A number of tires were made to the same specification which specified a 16-minute cure. They were made without pre-curing the treads as above described. These tires were cured 12 minutes instead of the specification requirement of 16 minutes and all treads were undercured as indicated by porosity and small holes in the inside of the tread near the carcass. Thus, with said irradiation process, the curing time of tires may be substantially reduced and considerable savings effected.

It may be desirable to pre-cure or partially pre-cure a portion of a section of the tread stock as by irradiation which rearranges the molecular structure of the rubber in the tread stock prior to assembling the tread with the carcass or at any other time prior to final curing of the tire. It may be desirable to pre-cure by such irradiation only a section or a portion of a section of tread stock or it may be desirable not to pre-cure a portion such as the thin edges of tread stock, or a central section of the tread stock and to pre-cure only a portion of a section of said tread stock. The desire to use any of many choices will depend to a great extent on the design of the tire and the tread. Some of these options will be described later. The irradiation may be applied to the inner surface of the tread stock or the outer surface which forms the surface of the tread which contacts the road. Sometimes the pre-curing or partial pre-curing of the outer surface will be applied to the tread stock after assembly with the carcass, but the outer surface may be pre-cured or partially pre-cured before assembly with the carcass.

The effectiveness of a shield to block all treatment by irradiation which rearranges the molecular structure usually depends on the density of the shielding material and its thickness. A shield which permits the passage of irradiation which rearranges the molecular structure limits the depth of treatment or cure which depth usually depends on the density (i.e. the mass per unit volume) of the shield material and its thickness. The denser the material, the greater its ability to block said treatment. For example, lead has a greater density than aluminum and therefore is more effective in blocking said treatment. In any specific material the thicker it is, the greater its ability to block the irradiation. A shield of a thickness which permits the passage of radiation will reduce the depth of treatment, but does not necessarily reduce the degree of treatment or cure.

Figure 7:
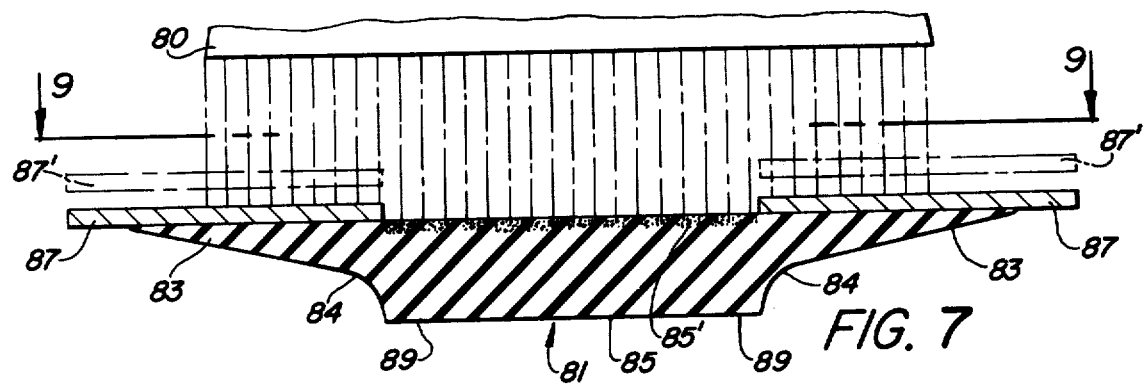
FIG. 7 is a section through a scan horn irradiating the entire central portion of a tire tread stock with the edges of the tread stock covered by shields.
Figures 9, 10:
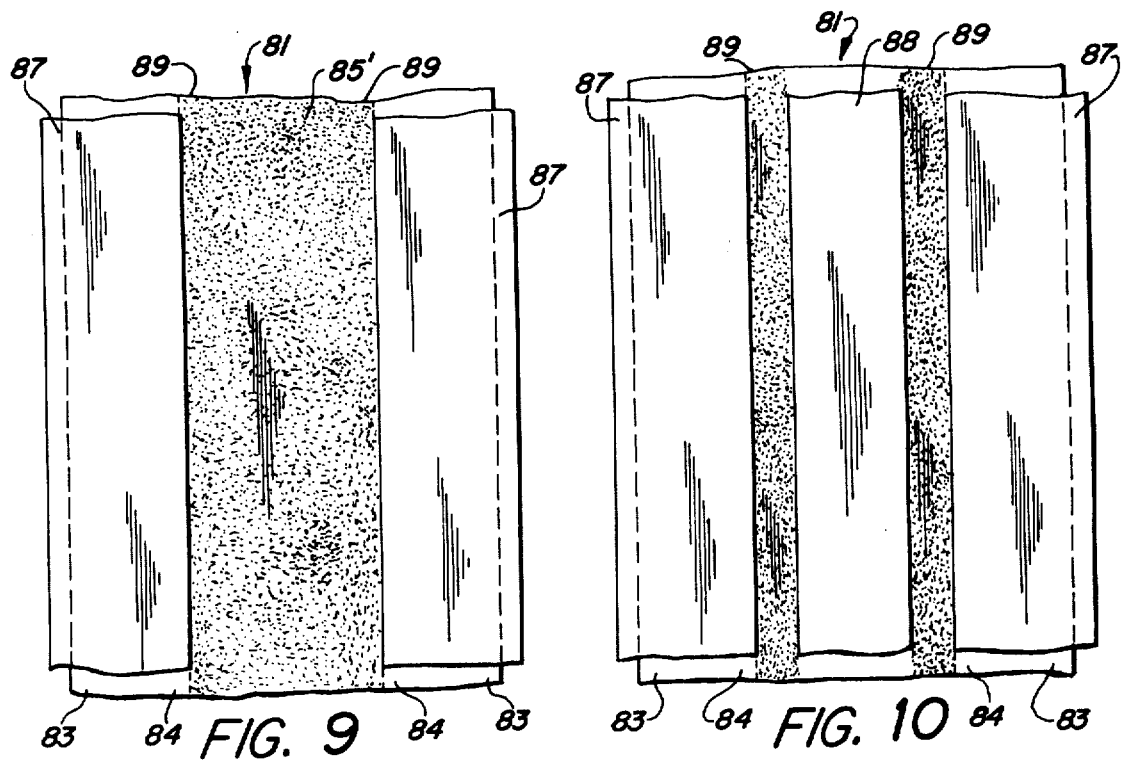
FIG. 9 is a plan view of the tread stock and shields of FIG. 7.
FIG. 10 is a plan view of the tread stock and shields of FIG. 8.
Figure 11:
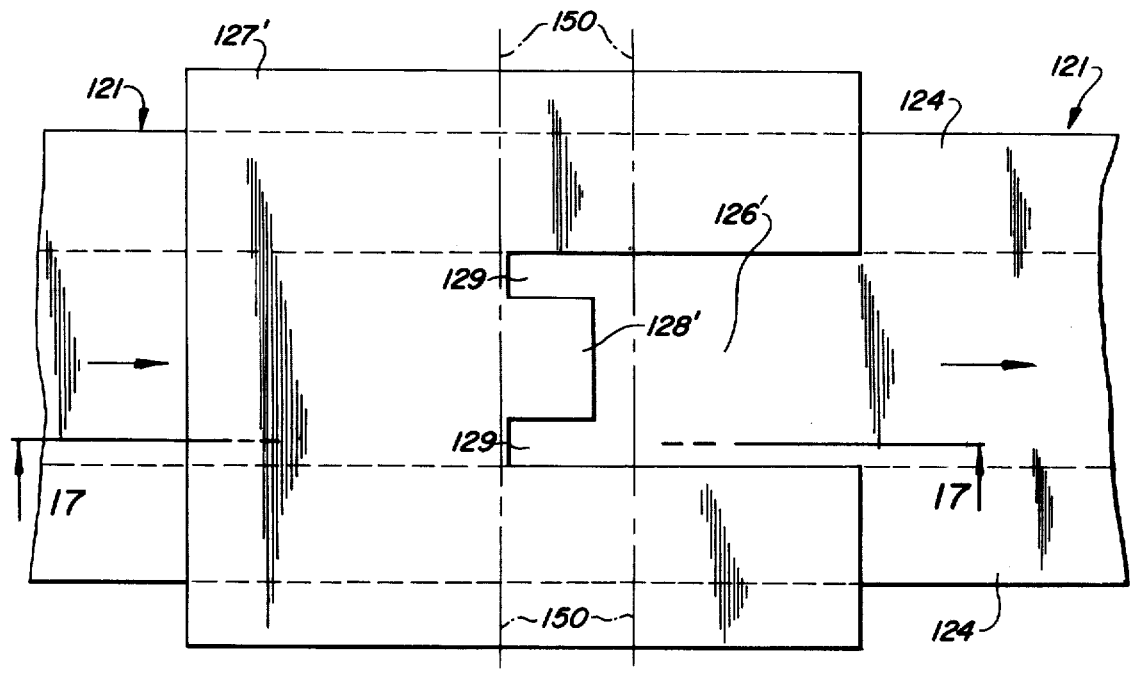
FIGS. 11 and 12 are each a plan view of a tread stock moving under a shield.
Figure 12:
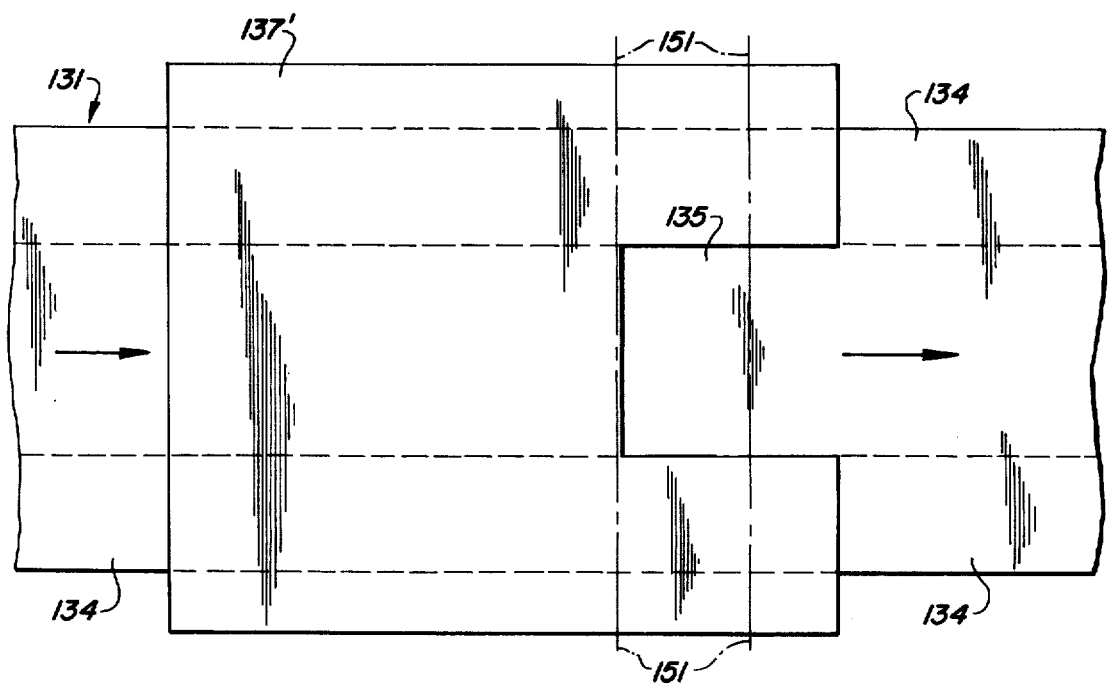

FIG. 7 is a section through tread stock and equipment which irradiates the entire central section 85 of a tire tread stock 81, and FIG. 9 is a top view thereof. The section 85 of the tread stock will form the section of the tread which will contact the road. The tread stock has tapered edges with thin portions 83 and thick portions 84. The sections 89 of the thick section 85 of the tread stock will form the shoulders of the finished tread. On the inner surface of the tread stock are shown shields 87 which prevent the tapered edges from being irradiated. An alternative arrangement uses shields 87', shown in phantom, instead of shields 87; they do not contact the tread stock and may be used in processes such as are shown in FIGS. 11 and 12 in which the tread stock is moved under the shields. Alternatively, the shields may be moved while the tread stock is stationary. The scan horn is 80. The dotted area 85' on the inner side of section 85 shows a portion of the tread stock being treated and cured or partially cured.

Figure 8:
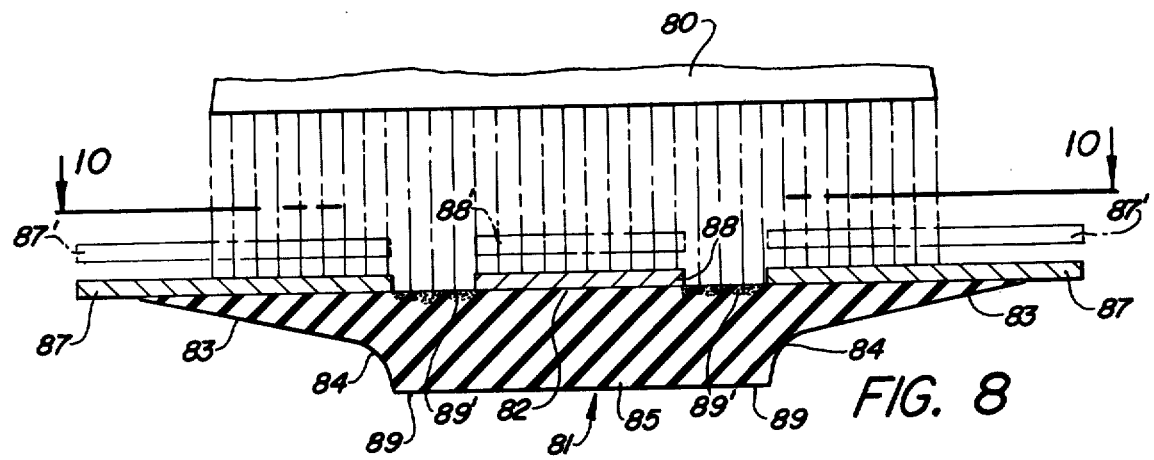
FIG. 8 is a section through a scan horn irradiating only the shoulders of a tire tread stock.

FIG. 8 is a section through tread stock and equipment which irradiates the inner surface of the shoulders 89 of tread stock 81 and a top view is shown in FIG. 10. The tread stock 81 has tapered edges with the thin portions 83 and thicker portions 84 and the entire thicker central section 85. On the inner side of the tread stock are shown shields 87 which prevent the entire tapered portions from being treated. Shield 88 prevents the central portion 82 of section 85 from being irradiated. This leaves only the shoulder areas 89 to be treated. The cured or partially cured portions are indicated by the dotted areas 89' at the inner surface of 89.

The shields 87 and 88 rest on the tread stock. The stock and shields may be stationary. Alternatively, the stock and shields may move together under the scan horn. The shields may be some sort of continuous device such as cylinders which rotate as the tread stock moves under them, in contact with them. The tread stock is usually extruded or calendered as a continuous strip, and may pass directly from the forming mechanism under the scan horn. The tread stock may move under the scan horn as individual pieces. The shields may be attached to the horn or be separately suspended. Generally, the horn remains in a fixed position, but this is not necessary.

Shields 88' and 87', shown in phantom in FIG. 8, are in positions where they do not contact the tread stock. These may be used in processes such as shown in FIGS. 11 and 12, and also in processes such as suggested in the previous paragraph.

Figure 17:
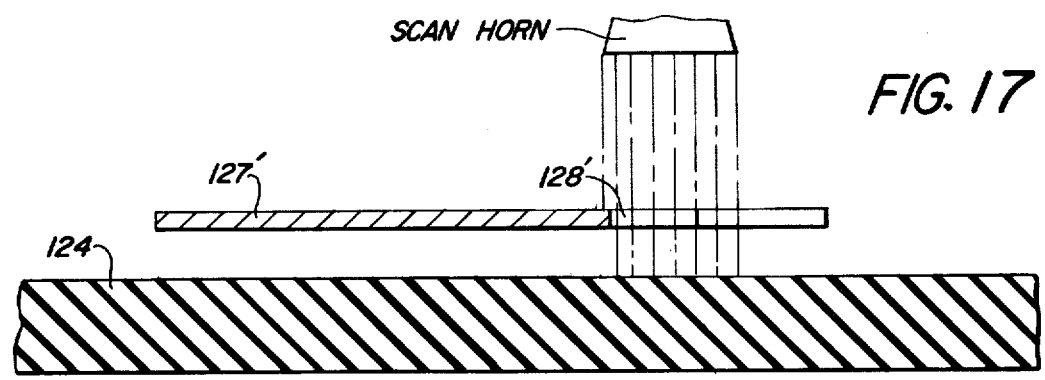
FIG. 17 is a section of the equipment shown in FIG. 11, on line 17—17, with a scan horn above the shield.

FIG. 11 is a plan view of tire tread stock 121 passing under shield 127' and being irradiated in the area 150 between the vertical dash-dot lines. The direction of movement of said tread stock is indicated by arrows. The shield 127' is between the scan horn, not shown, and the tread stock 121. It does not touch the tread stock. In the area 150 being irradiated, the shield 127' covers the tread stock edges 124, and the portion 128' of the shield protects a part of the central section of the tread and provides for greater radiation of the shoulders 129 than this central section. Therefore, as the tread stock moves under the shield, the shoulders 129 of the tread stock will be exposed to treatment a longer period of time than the center section of the stock 126'. Thus the shoulders 129 are being treated to a greater extent than the center section 126'. FIG. 17 is a cross section on the line 17—17 of FIG. 11.

FIG. 12 is a plan view of a tire tread stock 131 passing under shield 137' and being irradiated in the area 151. The direction of movement of said tread stock is indicated by arrows. The shield 137' is between the scan horn, not shown, and the tread stock which the shield does not touch. In the area 151 being irradiated the shield 137' protects the tapered edges 134 of the tread stock and therefore the central section 135 is all that is treated. In such processes it is necessary to register or properly align the tread stock 131 under the shield 137'. Such alignment may be effected by well-known means such as roller guides (or stationary guides), electronic guide means, etc.

FIGS. 11 and 12 are illustrative of apparatus and procedures for moving irradiation means and a sheet or other article relative to one another. The article may, for example, include other material than rubber, such as a metal article covered by a rubber or any synthetic or other material to be irradiated. The shield need not be of uniform thickness, but may vary in thickness to provide varied depths of irradiation of the rubber or other material. As indicated, the forward edge of the shield used need not be straight. However, it may be straight; it may be curved in any manner or slanted at an angle of less than 90° to the movement. Also, the shield may be composed of different materials which provide different depths of irradiation. Usually the scan horn will remain stationary and the tread stock will pass under it with shielding placed on the stock or fixed in a permanent position under the scan horn.

Figure 13:
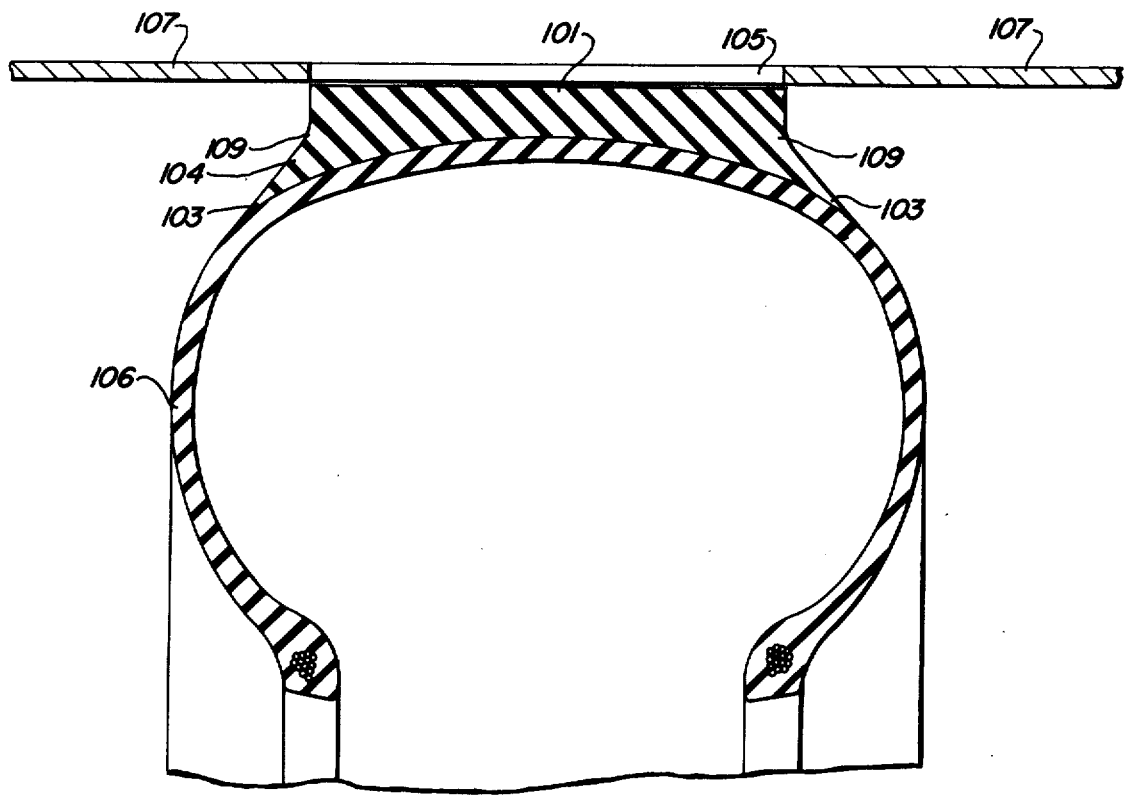
FIG. 13 is a section through a green tire over which is a shield with an opening in it to provide radiation of a shoulder-to-shoulder portion of a tread stock between the thin edges.

FIG. 13 is the section of a green tire 106 with tread stock 101 applied thereto with shoulder section 109 and tapered edges with thin portion 103 and thicker portion 104. Shields 107 protect the tapered edges. The tire or the horn, or both, are rotated to subject the portion of the tire under the opening 105 to treatment.

Figure 14:
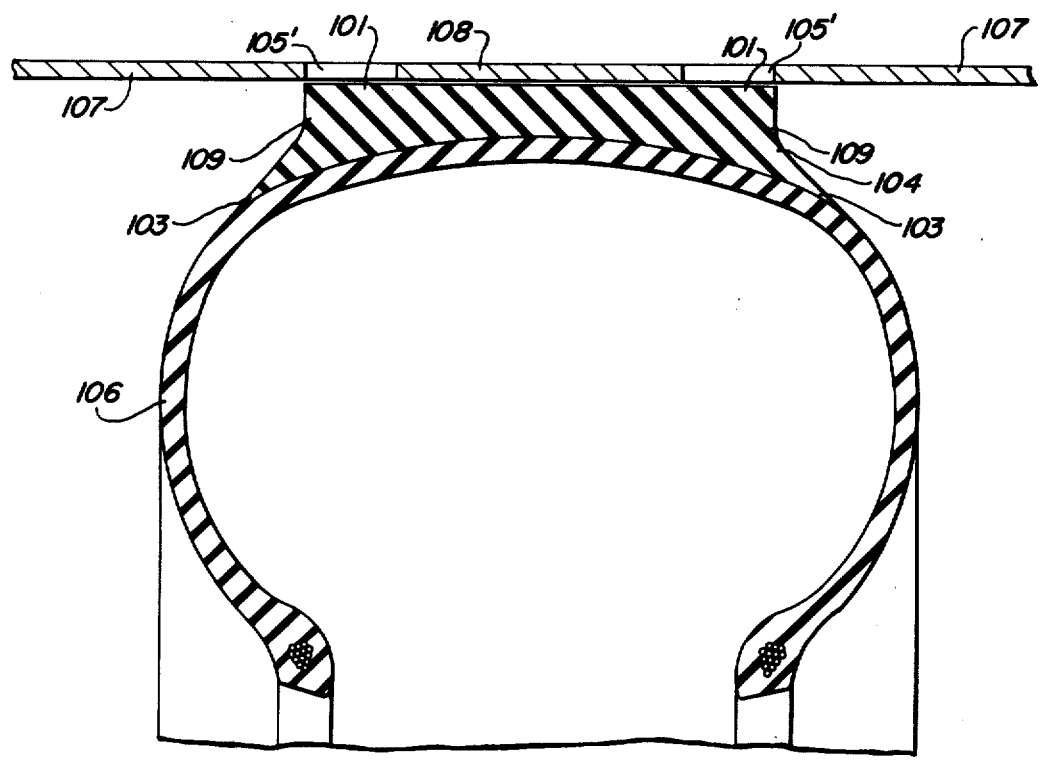
FIG. 14 is a section through a green tire over which is a shield with openings in it to provide radiation of the shoulders of the tread stock.

FIG. 14 is the section of a green tire 106 with tread stock 101 applied thereto with shoulder sections 109 and tapered edges with thin portions 103 and thicker portions 104. Shields 107 protect the tapered edges and shield 108 protects a middle portion of the tread stock. The tire or the horn or both are rotated to subject only the shoulders 109 through openings 105' to irradiation.

Figure 15:
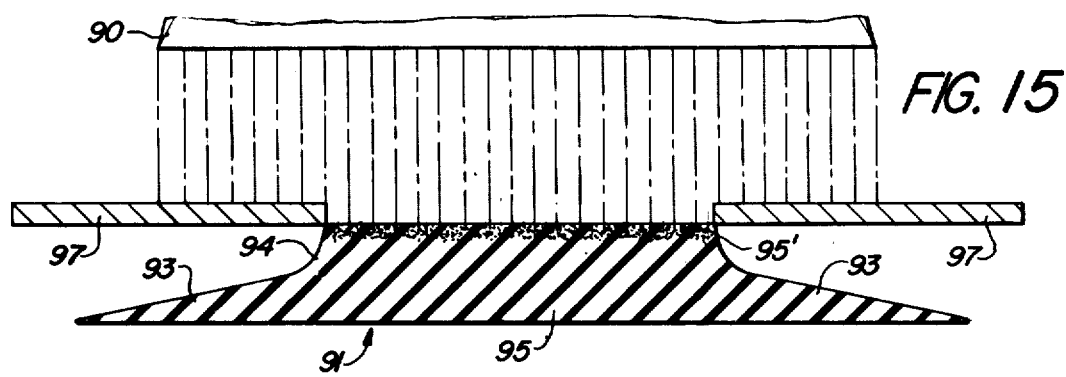
FIG. 15 is a section through a tread stock with separate shields covering the thin edges.

FIG. 15 is a section through equipment which irradiates the entire outer surface of section 95 of tread stock 91 which surface, when cured, will contact the road.

The portion 95' is cured or partially cured while the edges covered by shields 97 are not cured.

The scan horn is 90. This process may be used in cases when it is desirable to partially cure the entire section 95, said section being very thick. Irradiating from both inner and outer sides facilitates this objective.

Figure 16:
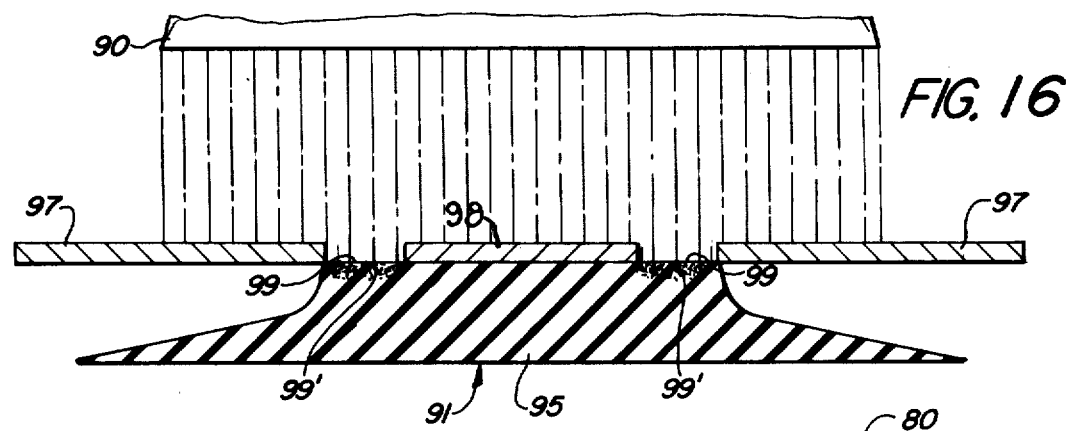
FIG. 16 is a section through a tread stock with separate shields covering the thin edges and the central section to provide radiation of portions of the green tread which will become shoulders of the finished tread.

FIG. 16 is a section through equipment irradiating the surface of section 99 of tire tread stock 91 which sections will form the shoulders of a tire tread. Sections 99 are a part of section 95 which forms the surface of a tread which surface will contact the road. The portions 99' indicated by dots are being cured or partially cured. Shields 97 shield the tapered edges from treatment and shield 98 shields a center portion of 95. Thus, sections 99 are the only unshielded areas. The scan horn is 90. This process may be used in any of the processes described in which the shields contact the tread stock; and by positioning the shields out of contact with the stock other processes may be utilized.

Figure 18:
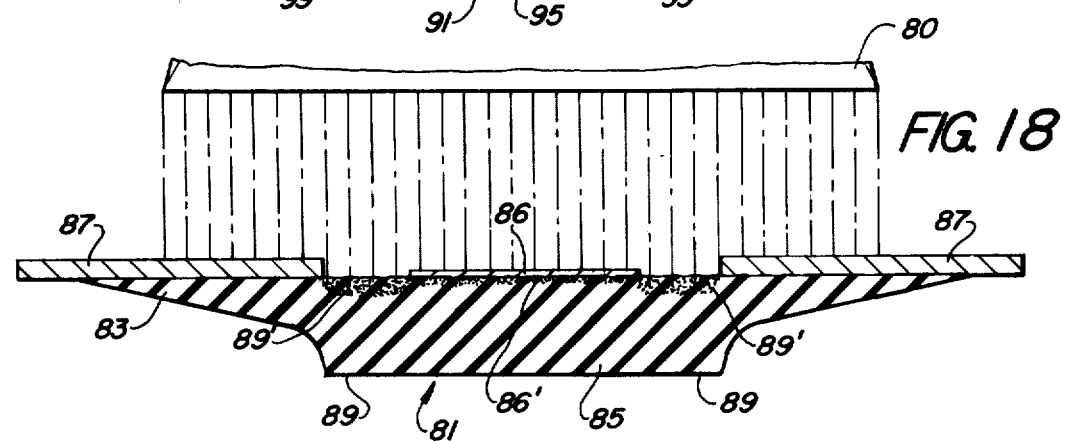
FIG. 18 is a section through a tread stock partially covered by thicker and thinner shields.

FIG. 18 is similar to FIG. 8 and differs only in that the shield 86 used on the middle of section 85 is thinner than that shown in FIG. 8. The shields 87 are thicker than shield 86 and completely block the treatment of the tapered edges of the tread stock. Sections of the tread stock 81 which are not shielded and are irradiated as indicated by 89' show that the curing or partial curing of section 89' is deeper than the curing or partial curing at 86' which depth is controlled by the thickness of shield 86.

Shield 86 may be made of material different from and have less density than that of shield 87 in which case it may be as thick or thicker than 87, and yet may not be as effective a shield as 87.

Figure 19:
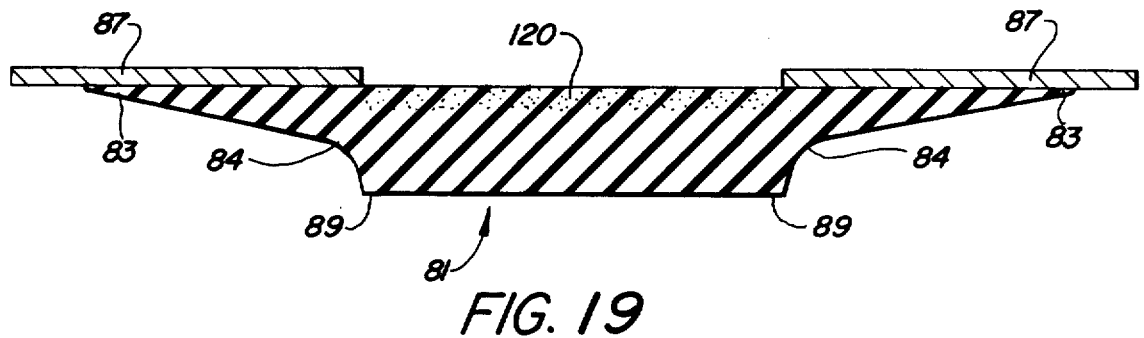
FIG. 19 is a section through a tread stock showing degree of cure after one exposure.

FIG. 19 shows tread stock 81 which has been treated by shielding arrangement shown in FIG. 7. The cured portion 120 is the dotted area. The shoulders are 89.

Figure 20:
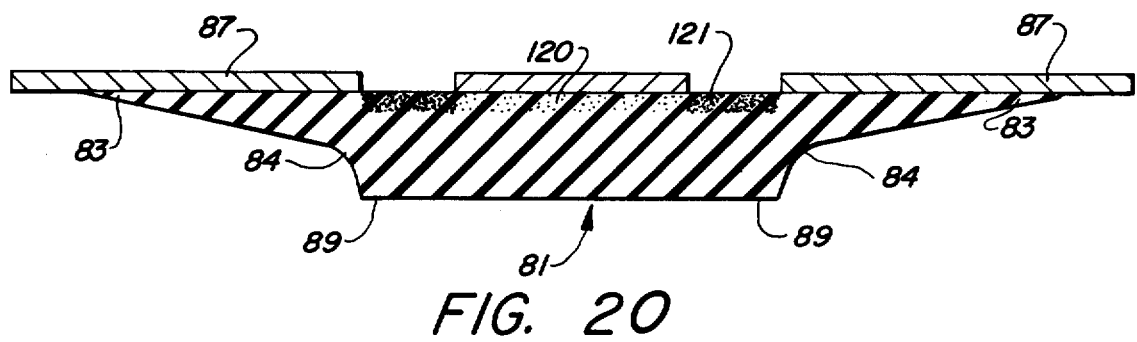
FIG. 20 is a section through the tread stock of FIG. 19 after being subsequently exposed to another treatment in the shoulder portions, only.

FIG. 20 shows tread stock 81 which was first treated as in FIG. 19 and then treated using the shielding arrangement shown in FIG. 8 so that only the shoulder sections 89 were successively treated, and were cured to a greater degree than the central portion of the tread as indicated by the greater number of dots in area 121 than in area 120.

In considering the effect on rubber of irradiation that rearranges the molecular structure, two factors are important, namely, (1) the depth of penetration of the irradiation and (2) the intensity or degree of irradiation. We are here concerned with the effect shielding has on these factors.

Shielding has heretofore been used as a preventative process because it absorbs all radiation. However, as disclosed herein, it may be used to control the depth of radiation and to control the degree of treatment or cure.

It may be desirable to treat an article with a greater degree of treatment in one portion and a lesser degree of treatment in another. This may be accomplished by treating an article as shown in FIG. 8 and then repeating the treatment after removing shield 88 so that both section 89' and section 82 have been treated, but 82 to a lesser degree than 89'. This effect has been accomplished by treating section 89' twice and portion 82 only once.

This may also be accomplished by a process which involves passing a tread or other article successively under two scan horns, the shielding under the first horn being arranged as shown in FIG. 8 using shields 87' and 88' and using shields under the second horn arranged as shown in FIG. 8 but eliminating shield 88'. Thus, by exposing the article under the first scan horn with its shielding arrangement and then under the second scan horn with its shielding arrangement, the section 89' would be treated twice and therefore to a greater degree than section 82. The first and second horns may be set up in tandem and operated as a continuous process wherein a conveyor or other device would convey the article, such as tread stock, exposed to the first scan horn and then exposed to the second scan horn. Various combinations of the above apparatus may be used. Thus, when two sections or two portions of a tread are subjected to irradiation which rearranges the molecular structure, one section or one portion is cured to a greater degree than another section or portion.

One section of an article may be treated to a greater depth than another. A way of doing this is shown in FIG. 18 wherein section 89' is treated to the same degree but to a greater depth than section 86'. This is accomplished by the shieldings. Shields 87 block all treatment from the tapered edges 83 and shield 86 permits some treatment to pass through it limiting the depth of the cure but not the degree of cure. Therefore the shoulders 89' are cured to a greater depth than the portion 86' which is indicated by the dotted areas. When using electron irradiation this may be accomplished without shielding, by varying the voltage. The higher the voltage, the greater the depth of cure. Accordingly, a first section or portion may be treated by such irradiation using a higher voltage than is used in a second section or portion. Thus the first section or portion will be cured to a greater depth than the second section or portion. This may be advantageous in cases such as in the treating of tread stock where it may be desirable to treat the shoulder section of tread stock to a greater depth than a middle portion.

Reference is made to FIGS. 7, 8, 9, 10, 13, 14, 15, 16, 17, 18, 19 and 20 which refer to pre-curing or partially pre-curing tread stock. Other products may be treated by the same processes to rearrange the molecular structure.

The scan horn in the drawings scans the electron beams around a central axis and through a titanium alloy window so as to properly treat the material. Any suitable radiation device that rearranges the molecular structure may be used.

The tread stock 81 of FIGS. 7, 8, 9, 10 and 18, 19 and 20, and tread stock 101 in FIGS. 13 and 14 and tread stock 91 of FIGS. 15 and 16 is of the usual shape, the outer edges being thinner than the central section, and tapering toward the outer edges. Unless these edges are shielded, precuring by radiation may cause over-curing when the tire is subsequently cured by a conventional or other method. In usual practice shielding would be used to block all treatment or control the depth of treatment. Generally, shielding will be used to prevent any pre-curing of the tread stock edges by irradiation. The section 85 in FIGS. 7, 8 and 18 is that section of the tread stock which will form the section of the tread which will contact the road. The sections 89 of the tread stock will form the shoulders of the tread.

FIGS. 7 and 15 show shielding the outer edges of the tread stock to prevent curing. The tread stock may be extruded or calendered or formed by any other method and any method may form the tread stock in the shape shown in FIGS. 7 and 8 or as a ribbon or a strip and said tread stock may be treated by irradiation which rearranges the molecular structure. Said treatment may be effected before said tread stock is assembled with the tire or anytime before the whole tire is subjected to final curing. The shields 87 of FIG. 7 may be thick aluminum sheets, e.g. ¼ inch (or 0.6 to 0.7 cm.) thick. They may be placed on the inner surface of tread stock as shown in FIGS. 7 and 8, or raised somewhat as shown in phantom in these figures.

FIG. 8 shows an additional shield 88 covering the central portion 82 of section 85 of the tread stock, which shield may completely absorb all of the irradiation and prevent curing under the shield.

The outer sections 89 of the thick central section 85 of the tread stock are not shielded in FIGS. 7 or 8. This may be desirable if in the ultimate shape of the tread these outer sections 89 are shaped into shoulders that are thicker than the rest of the central section of the tread. By this process desired portions of the shoulders may be precured or partially pre-cured by irradiation which rearranges the molecular structure to a greater degree than other portions of the tread stock. Such tread designs which include thick shoulders are common and the curing of them has presented a problem which the industry has not yet successfully overcome. The extra thickness of the tread shoulders has necessitated long curing times sufficient to cure the shoulders of the tread which time periods are, in most cases, much longer than needed to cure the rest of the tire. Thus, by pre-curing or partially pre-curing the shoulder area of the tread stock or portions thereof by the said irradiation, as herein disclosed, the curing time of the tire may be shortened and thus substantial saving may be effected.

By pre-curing portions of the shoulder sections and other portions of the tread by such irradiation, the final curing time of the tire may be further reduced.

As indicated, the shields need not touch the tread stock. They may be placed at an angle or they may extend in a straight line covering the thin edges of the tread stock. FIG. 13 shows shields 107 located in the latter position. FIG. 19 shows such shields 107 and an additional shield 108 over the central section of the tread stock.

It is usually advantageous to have the irradiation which rearranges the molecular structure directed against the underside of the tread stock, for in most cases it may be only necessary to pre-cure or partially pre-cure the tread stock adjacent the inner surface. In the conventional tire press approximately 80 percent of the heat to cure the tread section of the tire comes from the inside of the tire and 20 percent from the mold which contacts the outside of the tire. Due to the fact that most tire fabrics are a poor conductor of heat and the tire tread is thick, the design of many tires is such that the most difficult part to cure is in the shoulder of the tread next to the carcass and in such cases the first indication of undercure is in the shoulder area. It has been found that by partially curing the tread stock with said irradiation prior to assembly with the carcass of the tire, the tire-curing time can be reduced and the tire will be completely cured. This may be accomplished by partially curing by said irradiation at least a portion adjacent the inner side of the tread stock. In some cases the said curing may be only in the shoulder section 89 (FIG. 8) of the tread stock. In another case the curing may only be in the section 85 (FIG. 7) which forms that section of the tread which contacts the road. The section or sections to be cured and the depth and degree of cure by said irradiation will be determined to a great extent by the design of the tire.

In preparing a tread stock for a tire it may be desirable to pre-form the tread stock before applying it to the carcass. The stiffness and/or nerve in the tread stock may make it difficult to apply to the carcass. After being applied, the increase in the nerve may make it difficult to secure it in position against the carcass so as to be properly cured during the curing operation. In this situation the nerve may be sufficient to cause the tread to have a tendency to pull away from the carcass. When a treated tread is changed in shape, the nerve in the tread stock tends to pull it back toward its original shape. In some cases it may be desirable to pre-form the tread stock prior to its application to the carcass. The object of this is to kill the nerve effect just described. This may be done cold or by warming the tread stock before pre-forming. However, when a tread stock is treated by irradiation which rearranges the molecular structure, it may be desirable to pre-form it immediately following said operation while the tread stock is still warm, having been slightly heated during the irradiation. Such pre-forming may give the tread stock the general or approximate shape it will have when applied to the carcass. In some cases it may be desirable to pre-form the tread stock before or while being irradiated. These methods may be used with tread stock and other articles.

Thus the curing or partial curing of an article by such irradiation, shaping and then completing the cure in another operation may be advantageous.

It is to be understood that methods and apparatus disclosed herein may be used in the manufacture of new tires, retread tires and other articles.

RETREADING TIRES

Various ways are disclosed for retreading tires. In each case the carcass will be prepared for retreading in the usual manner by removing unwanted tread and, depending upon the shape of the retread which is to be applied, a part of the sidewall stock may be removed, all of which is customary in the different methods of retreading, using different equipment.

FIG. 3 shows a mold for extruding tread stock into position on the uncured or cured carcass of a new tire. The equipment of FIG. 3 and the general method there disclosed may be used for applying the tread stock to a carcass which is to be retreaded; this operation taking place after the carcass has been prepared in the usual manner. It may be desirable to use air at room temperature or cooler, and water at tap temperature or cooler in the tire to create pressure in the tire. It may also be desirable to so design the mold that the heating cavity is only approximately over the tread stock which is being applied.

The advantages of this method of retreading tires are elimination of tread-building facilities and the inventories of prepared uncured treads all of which reduce costs. Also the carcass is subjected to less heat which has a deteriorating effect.

Figure 4:
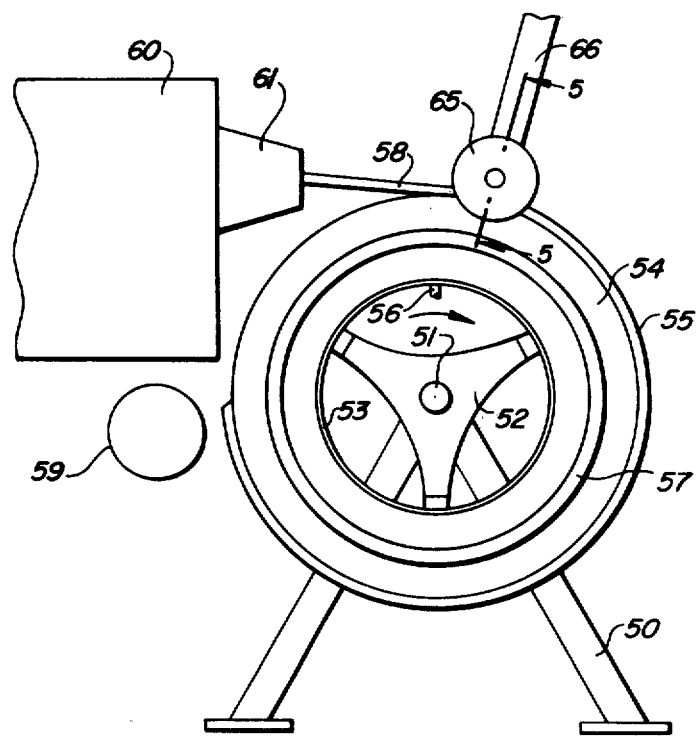
FIG. 4 is an elevation of a stand with a tire being retreaded on it, with the tread stock being extruded, and means for shaping the tread.

Instead of extruding the tread stock into a mold, the tread stock may be extruded onto a prepared carcass by rotating the carcass and using a suitably shaped nozzle that covers the width of the tread, or a narrower nozzle, the stock being reciprocated back and forth over the surface of the carcass to build up a retread. Suitable apparatus is illustrated in FIG. 4. The extruded rubber will ordinarily be heated to approximately 280° F. or lower or higher to make it sufficiently plastic to be used as described. It may or may not contain sulfur and/or curing agents and/or accelerators. Some volatile solvent may be added to the rubber which will be evaporated before the curing of the tread is commenced, although usually this will be avoided because of the danger of solvent vapor forming pockets in the tread.

Figure 5:
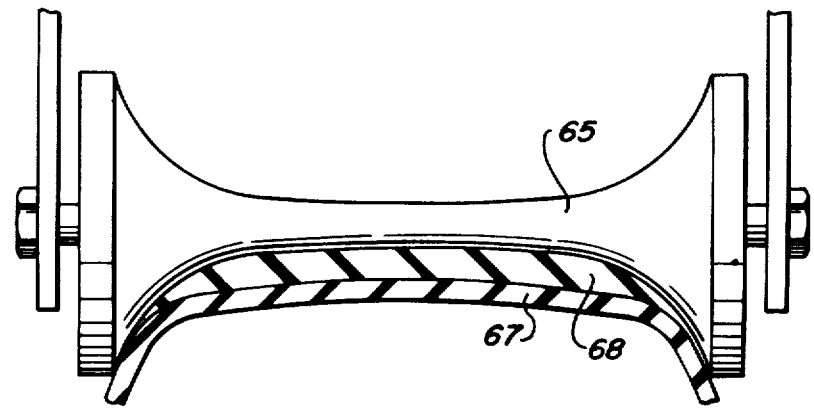
FIG. 5 is a section on the line 5—5 of FIG. 4 showing a roller that may be used for shaping the tread stock in position on a section through a tire being retreaded.

The methods illustrated in FIGS. 4 and 5 are particularly designed for the retreading of airplane and truck tires which have a tread which is only grooved, but may be used for any tires. FIG. 4 shows stand 50 with axle 51 supporting wheel 52 with rim 53 on which the tire carcass 54 is mounted. A valve 56 in the rim through which the tire may be inflated gives it some rigidity during the application of the tread stock. The tire is provided with a scuff ring 57, but it is to be understood that tires of any shape and design may be retreaded by the method disclosed. As illustrated in FIG. 4, tread stock 58, sufficient to form the tread, is extruded from extruder 60 through nozzle 61. A forming tool 65 is positioned on the supporting means 66 to shape the tread as the tread stock is extruded; and, if desired, forming tool 65 may exert some pressure to force the formed tread against the carcass. There may be additional forming tools, such as 65, at other points on the circumference of the tread for the purpose of shaping and/or pressure. The scan horn 59 may be located to treat the tread stock at any desired stage of its formation. For example, it may be located to treat the tread stock immediately after it leaves the nozzle 61, or the scan horn 80 of FIGS. 7 and 17 may be directed to treat the underside of the tread stock as it passes on a conveyor (not shown) past the horn. After the tread stock is applied to the carcass, the tire may be rotated several times for the purpose of shaping and/or pressure.

The tread stock may be extruded with the proper tread outline and tread-forming tool 65 may be positioned on the supporting means 66 to maintain the proper shape and/or exert pressure on the tread to press it against the carcass. There may be other forming tools, such as 65, at other points on the circumference of the tire.

Various methods of shielding and pre-curing have been discussed. Where applicable, tread stock to be used in retreading may be treated as there described.

Figure 6:
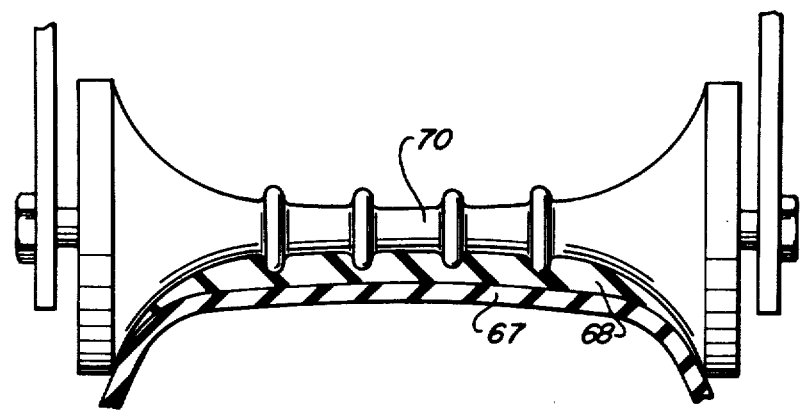
FIG. 6 is a section through a modified roller.

Another method of operating is to extrude the tread stock as a thin ribbon the width of the tread, while the tire is being rotated, and after quite a few rotations sufficient tread will be applied to build up the desired tread thickness. As the ribbons are being applied to the tire, the tread-forming roller will shape them to the proper design. A roller 70, such as illustrated in FIG. 6, may be used. The carcass 67 is shown with green tread 68 built upon it.

Another method of operating is to extrude a tread stock as a thin, narrow strip while the tire is being rotated. The strip is oscillated back and forth across the tread portion and after quite a few rotations sufficient tread will be applied to build up the desired tread thickness. As the ribbon is being applied to the tire the tread-forming tool 65 or tools shape it to the proper design. A tire retreaded in manners just disclosed, is preferably cured by electron irradiation which may be accomplished by rotating tire and wheel 54 and 52, respectively, under a radiation device such as device 12 shown in FIG. 1; and, if desired, may be cured in a conventional manner or a combination of both. A grooved tread design may be cut into the tread by any conventional method or a groove may be rolled into the green tread by forming tool as shown in FIG. 6, preferably after the green tread has been built up or while the last layer is being laid on the green tread.

A method which is preferred is illustrated by FIG. 4. Tread stock 58, being a thin ribbon, for example, approximately ⅛ inch thick, and approximately the width of the tread, is extruded as the tire is rotated and the tread is built up to any desired thickness. Forming tool 65 shapes the tread and several other forming tools may be used. Radiation device or horn 59, similar to or identical with device 12 in FIG. 1, is illustrated in FIG. 4. It only partially cures the green tread during each exposure as the green tread is passed by it. The cure may, for example, be only a one-fourth cure. The radiation device may be adjusted to cure to a depth of ⅛ inch, more or less. At the completion of each rotation the surface is only partially cured and, therefore, the next layer of hot stock adheres to it. The green tread is progressively vulcanized as the rotation continues and the successive layers are adhered to one another.

If a layer of the green tread is one-quarter cured on each exposure, at the completion of the fourth rotation the first layer is fully cured, the second layer is three-fourths cured, the third layer is one-half cured, and the fourth layer is only one-fourth cured. This "progressive irradiation" continues until the last layer is applied and then the tire is given three additional rotations which cures the last three layers.

A ribbon not the full width of the tread may be used and oscillated back and forth across the tread surface until the desired tread thickness is obtained, the level of radiation being adjusted to obtain the proper cure.

Grooves in the tread may be made by the use of a forming tool such as the tool 70 shown in FIG. 6.

In preparing a multi-layer tread stock, one layer or a part thereof may be treated with irradiation which rearranges the molecular structure before said layer is placed in contact with another layer which may or may not have been treated with said irradiation. This may be done before the layers are applied to the carcass or during said application.

In each of the retreading operations in which the tread stock is cured by irradiation, this tread stock may include sulfur and other curing ingredients, or it may contain no such curing compositions because irradiation rearranges the molecular structure of the rubber and thus cures it. A small amount of sulfur may be included in such tread stock, and the extrusion will take place rapidly before the rubber becomes objectionably cured at the extrusion temperature. The amount of curing ingredients that can be incorporated in the tread stock will depend upon the extruding temperature and the length of time that the tread stock is maintained at this temperature. It is desirable to include a small amount of sulfur and accelerator so that the tread stock will cure to a slight extent after it has left the extrusion device and been shaped on the carcass. Such setting of the retreading stock will facilitate handling the retreaded tire before the cure is completed. If a normal amount of sulfur, etc. are included in the rubber, unless the time during which the stock is heated is very short, curing will set in and the rubber will become pre-cured before it is shaped on the carcass. An exception is, when cold-feed extruders are used, in which case cold stock is fed into the machine and is raised to high temperatures only for a small increment of time before being extruded.

The advantages of these methods of retreading include not heating the carcass in a mold, and, therefore, the life of the tire is increased and the tire may be retreaded a greater number of times, the curing time is shorter, press equipment is eliminated and inventories of green tread stocks are eliminated and thus savings in cost are made.

Various methods of treating tread stock for retreading which are disclosed herein may be utilized in the treatment of tread stock for new tires.

Apparatus and processes for forming treads for retreading and new tires and curing the tread stocks by electron irradiation have been disclosed. These tread stocks may be of ordinary rubbers (except those which cannot be cured by electron irradiation, such as butyl rubber), and it has been explained that no sulfur is required for curing by irradiation. A desirable tread stock material is a high molecular weight butadiene-styrene copolymer such as has been found desirable for tread stocks, but which is of high viscosity and difficult to hand in ordinary processing equipment. Reinforcing agents, antioxidants, antiozonants, etc. may be included even though no sulfur is added.

Shielding of less than the whole of any such body of material prevents or controls the effect of the irradiation. Shielding may be utilized to prevent such irradiation from contacting one or more portions of an object or composition, etc. and producing a chemical or other effect thereon, and to control the extent or depth of irradiation on an object or composition. By using two or more shields, the same or different effects may be produced in different volumes of a material being treated, such as the depth and/or intensity of the effect of the radiation. Shields of different compositions may be used simultaneously or successively, and a single shield may comprise different areas which have different effects on irradiation. Thus the foregoing disclosure is illustrative of the equipment which may be used and the effect of shielding on different materials for different purposes.

In the following claims, the designations below are used in the following specific meanings, which are in common use in tire factories:

When a rubber composition containing all of the prescribed ingredients is extruded or otherwise shaped, in profiled strip form for application to a tire, it is referred to as "tread stock".

When the tread stock has been applied to a tire carcass, it is called "green tread".

When the tread stock has been sufficiently cured for service on a tire, it is called "tread".

I claim:

1. The process of preparing a tire tread stock which includes rubber which is curable by electron irradiation, which process comprises treating and thereby at least partially curing at least a portion of said tire tread stock by exposure to electron irradiation or other means of radiation having the same curing effect on the exposed rubber, before the at least partially uncured tire with said treated tread stock assembled thereon is placed in a mold for the final cure of the tire.

2. The process of claim 1 in which the irradiation is effected by electrons.

3. The process of claim 2 in which the tread stock is irradiated with said irradiation from one surface such that beyond the depth at which said rubber is irradiated there is uncured rubber, and thereafter curing said uncured rubber.

4. The process of claim 2 in which the inner side of the tread stock is partially cured by said irradiation prior to curing the outer surface of the tread stock.

5. The process of claim 2 which comprises partially curing at least a portion of the tread stock by irradiation and thereafter subjecting at least a part of said portion of the tread stock to further curing.

6. The process of claim 2 in which a first surface of the tire tread stock is at least partially cured by electron irradiation using such voltage that said surface is cured to a greater degree than the opposite surface.

7. The process of claim 2 in which a surface of extruded tread stock is irradiated and the irradiated surface and a carcass surface are thereafter brought into contact.

8. The process of claim 2 in which relative movement is effected between said irradiation-curable rubber and the source of the irradiation and the irradiation enters only one surface of the rubber throughout the movement.

9. The process of claim 1 in which multi-layer stock is to be incorporated in a tread, and in which at least a portion of one layer of said stock is at least partially cured by said irradiation.

10. The process of claim 9 in which the irradiation is effected by electrons.

11. The process of claim 10 in which, after said curing, said layer which contains rubber which is curable by said irradiation is placed in contact with another layer.

12. The process of claim 10 in which said layer which contains rubber which is curable by said irradiation will be the inner layer of said tread and said inner layer is placed in contact with a tire carcass.

13. The process of claim 10 in which said layer which contains rubber which is curable by said irradiation and is partially cured by said irradiation will be the outer layer of said tread.

14. The process of claim 1, which process comprises curing or partially curing at least an inner portion of said tread stock by exposure to said irradiation.

15. The process of claim 14 in which the curing is effected by exposure to electron irradiation.

16. The process of claim 1 which comprises curing or partially curing at least an outer portion of said tread stock by exposure to said irradiation.

17. The process of claim 16 wherein the curing or partial curing is effected by exposure to electron radiation.

18. The process of claim 1 in which both surfaces of the tread stock include rubber which is curable by said irradiation, which process comprises treating from both surfaces by exposure to said irradiation.

19. The process of claim 18 wherein the curing is effected by exposure to electron irradiation.

20. The process of claim 1 wherein said portion will contact the carcass.

21. The process of claim 20 wherein the curing is effected by exposure to electron irradiation.

22. The process of preparing a tire tread the tread stock for which includes rubber which is curable by electron irradiation and curable by sulfur and heat which process comprises at least partially curing at least a portion of said tread stock by exposure to electron irradiation or other means of radiation having the same curing effect on the exposed rubber and thereafter assembling said tire tread with other tire elements and curing said portion by sulfur and heat.

23. The process of claim 22 wherein the irradiation is effected by electrons.

24. The process of preparing a tire which comprises winding onto a carcass a length of tread stock which is treated with electron radiation or other means of radiation having the same curing effect on the exposed rubber, and by relative rotation between the tread and a source of such treatment, progressively curing the tread as it is wound onto the carcass and the successive layers are adhered to one another, and continuing the progressive curing by such treatment until the last layer of the tread is wound onto the carcass and cured.

25. The process of claim 24 in which the irradiation is effected by electrons.

26. An unfinished tire having a green tread at least a portion of the thickness of which is curable by electron irradiation or other means of radiation having the same curing effect on the exposed rubber, at least a portion of the thickness of which green tread has been only partially cured by exposure to such irradiation and contains sufficient chemical curing ingredients for completion of cure.

27. A green tread as in claim 26 in which the partial cure was effected by exposure to electrons.

28. A pneumatic tire the tread of which is not completely cured, a portion of the thickness of the tread adjacent the carcass comprising rubber curable by electron irradiation and which portion is at least partially cured by exposure to said irradiation, at least most of the exposed surface of the tread being uncured or cured to a lesser extent than said portion adjacent the carcass.

29. A green tire no part of which is completely cured, and the major parts of which contain an unreacted curing agent, and at least a portion of the tread of which has been partially cured by exposure to electron irradiation or other means of radiation having the same curing effect on the exposed rubber.

30. A tire of claim 29 the outer surface of the tread of which is partially cured by exposure to electron irradiation or other means of radiation having the same curing effect on the exposed rubber.

31. A tire of claim 29 the inner surface of the tread of which is partially cured by exposure to electron irradiation or other means of radiation having the same curing effect on the exposed rubber.

32. A tire of claim 29 with at least a portion of one surface of its tread cured to a greater degree by exposure to electron irradiation or other means of radiation having the same curing effect on the exposed rubber than the opposite surface.

33. A tire of claim 29 wherein the radiation was electron radiation.

34. A tire of claim 30 wherein the radiation was electron radiation.

35. A tire of claim 31 wherein the radiation was electron radiation.

36. A tire of claim 32 wherein the radiation was electron radiation.

37. A tire of claim 33, both surfaces of the tread of which have been subjected to electron radiation treatment.

38. A tire of claim 33 having a multi-layer tread at least one layer of which has been subjected to electron radiation treatment.

39. The process of preparing a tread for a pneumatic tire which includes rubber containing sulfur which rubber is curable by exposure to electron irradiation or other means of radiation having the same curing effect on the exposed rubber, which process comprises effecting the curing of said tread by a combination of curing processes, first partially curing at least a portion of said rubber by exposure to electron irradiation or other means of radiation having the same curing effect on the exposed rubber and thereafter curing said rubber with heat and sulfur.

40. The process of claim 39 in which said tread includes rubber curable by electron irradiation and rubber curable with heat and sulfur, which process comprises first partially curing by exposure to electron irradiation and thereafter curing with heat and sulfur.

41. The process of claim 39 which process comprises first partially curing by exposure to electron irradiation and thereafter curing by another method.

42. The process of preparing a molded tread for a tire which tread includes rubber curable by exposure to electron irradiation or other means of radiation having the same curing effect on the exposed rubber, which process comprises after said rubber has been incorporated in a tread stock treating and thereby partially curing at least a portion of said rubber by exposure to said irradiation and thereafter placing said tread stock in a mold.

43. The process of claim 42 wherein said tread includes rubber curable by electron irradiation, which process comprises partially curing at least a portion of said rubber by exposure to electron irradiation before placing said tread stock in a mold.

44. The process of preparing a tread for a tire which tread includes rubber curable by exposure to electron irradiation or other means of radiation having the same curing effect on the exposed rubber, which process comprises after said rubber has been incorporated in the tread stock partially curing said rubber by exposure to said irradiation and thereafter curing the tread in a mold.

45. The process of claim 44 wherein said tread includes rubber curable by electron irradiation and partially curing said rubber by exposure to electron irradiation and thereafter curing said tread in a mold.

46. The process of preparing a tread for a tire the green tread for which includes rubber which is curable by electron irradiation which process comprises at least partially curing at least a portion of said green tread on the carcass by exposure to electron irradiation or other means of radiation having the same curing effect on the exposed rubber before molding of the assembled thread.

47. A tire having a green tread made by the process of claim 46 in which the portion at least partially cured includes the inner surface and the radiation was electron irradiation.

48. The process of claim 46 wherein the radiation is electron radiation.

49. The process of preparing a tread for a tire the green tread for which includes rubber which is curable by electron irradiation and curable by sulfur and heat which process comprises at least partially curing at least a portion of said green tread by exposure to electron irradiation or other means of radiation having the same curing effect on the exposed rubber and thereafter curing said green tread rubber by sulfur and heat.

50. The process of claim 49 wherein the radiation is electron radiation.

* * * * *